United States Patent
Haugstad

(10) Patent No.: US 8,021,095 B2
(45) Date of Patent: Sep. 20, 2011

(54) APPARATUS FOR REMOVAL OF PACKAGING MATERIAL FROM A BIG BALE

(75) Inventor: Roy Inge Haugstad, Sirevåg (NO)

(73) Assignee: T. Kverneland & Sonner AS, Kvernaland (NO)

( * ) Notice: Subject to any disclaimer, the term of this patent is extended or adjusted under 35 U.S.C. 154(b) by 798 days.

(21) Appl. No.: 11/912,960

(22) PCT Filed: Apr. 26, 2006

(86) PCT No.: PCT/NO2006/000156
§ 371 (c)(1),
(2), (4) Date: Dec. 17, 2007

(87) PCT Pub. No.: WO2006/118469
PCT Pub. Date: Nov. 9, 2006

(65) Prior Publication Data
US 2008/0159830 A1    Jul. 3, 2008

(30) Foreign Application Priority Data
Apr. 29, 2005   (NO) .................................... 20052131

(51) Int. Cl.
*A01F 25/20* (2006.01)
(52) U.S. Cl. ......... 414/412; 414/911; 414/24.6; 83/928; 241/605
(58) Field of Classification Search .................. 241/605; 414/111, 24.5–24.6, 25, 303, 412, 607, 621, 414/911; 53/381.2; 56/478; 83/648, 909, 83/923–924, 928
See application file for complete search history.

(56) References Cited

U.S. PATENT DOCUMENTS

| 3,513,522 A | | 5/1970 | Thomson |
| 3,853,235 A | * | 12/1974 | Lambert et al. ............... 414/412 |
| 4,838,751 A | | 6/1989 | Hanaya et al. |
| 4,996,899 A | * | 3/1991 | Henderson ........................ 83/23 |
| 5,371,938 A | | 12/1994 | Martin |
| 2003/0192416 A1 | | 10/2003 | Platon et al. |

FOREIGN PATENT DOCUMENTS

| EP | 0583742 | 8/1993 |
| WO | WO 96/28352 | 9/1996 |

OTHER PUBLICATIONS

Written Opinion, published on Aug. 10, 2006.
IPRP, published on May 2, 2007.

* cited by examiner

*Primary Examiner* — Gregory W Adams
(74) *Attorney, Agent, or Firm* — Gable Gotwals

(57) ABSTRACT

An apparatus (3, 103) for removal of packaging (11) from a big bale (1), the apparatus (3) comprising: at least one gripper (41, 141) arranged to hold on to a part of the packaging (11); at least one cutting means (31, 131) arranged to make at least a first cut through the packaging (11) at the binding material-covered face and substantially transversely of the longitudinal extent of the binding material, and optionally make further cuts through the packaging, preferably in the faces adjacent to the first cut, in order to create an opening in the packaging (11) enclosing the big bale (1); and at least one supporting means (23, 123), the at least one supporting means (23, 123) and/or the gripper (41, 141) being arranged to effect relative movement between the big bale (1) and the at least one gripper (41, 141), whereby the packaging (11) is separated from the contents (1a) of the big bale.

8 Claims, 10 Drawing Sheets

APPARATUS FOR REMOVAL OF PACKAGING MATERIAL FROM A BIG BALE

The invention regards an apparatus for removal of packaging material from a big bale, more particularly foil, baler twine, baler net etc. from a big bale typically containing straw material etc. for feeding e.g. farm animals.

Big bales wrapped in foil in the form of stretch film have gained widespread use within agriculture. The bale is formed by feeding the material, which constitutes the main ingredient, into a press where the material is compressed in a chamber. When the bale has achieved the desired size and/or density, a binding material is placed around parts of the bale, e.g. on the shell of a round bale or on four of the six sides of a square bale. The binding material may be twine, net or plastic foil. Preferably the bale is wrapped in stretch film by a wrapper made for this purpose, in order to preserve the bale in the case of ensiling or to protect the bale against precipitation. In most cases, before the wrapped material can be used as intended, e.g. prior to feeding out a straw material such as ensiled grass, the plastic foil and the binding material must be removed from the big bale.

The devices used for this purpose today are very basic. Typically the packaging is cut manually before the bale is lifted by bringing a bale fork connected to a lifting device such as a tractor-mounted front end loader into engagement with the bale, thus allowing the bale to be lifted. Then more cuts are made in the packaging before this is removed from the bale and the fodder is brought to a feeder or the feeding site.

The object of the invention is to remedy or reduce at least one of the drawbacks of prior art.

The object is achieved by features specified in the description below and in the following claims.

The invention regards an apparatus for removal of packaging from a big bale containing straw material fodder or other materials, the big bale being of any cross sectional shape.

The surface of the big bale is made up of several mutually adjacent faces, and the packaging is made up of any number of layers of plastic foil enclosing all or parts of the big bale, and optionally a binding material in the form of baler twine, baler net or similar, which holds the bale together, enclosing parts of the surface of the big bale, the apparatus comprising:

at least one gripper arranged to hold on to part of the packaging;

at least one cutting means arranged to make at least a first cut through the binding material and the plastic foil along the entire extent of the binding material-covered surface and essentially transversely of the longitudinal extent of the binding material, any further cuts being made in the surfaces adjacent to the first cut in order to create an opening in the packaging enclosing the big bale, which opening is located essentially opposite of the at least one gripper;

a supporting means and/or the gripper being arranged to provide relative movement between the big bale and the at least one gripper, whereby the packaging is separated from the big bale.

The invention regards an apparatus for removal of packaging from a big bale that may be held together by a binding material in the form of baler twine, baler netting or similar enclosing parts of the surface of the big bale, and the packaging is constituted by foil enclosing all or parts of the big bale plus said binding material, the apparatus comprising:

at least one gripper arranged to hold on to part of the packaging;

at least one cutting means arranged to make at least a first cut through the packaging and essentially transversely of the longitudinal extent of the binding material, and preferably also make any further cuts in the surfaces adjacent to the first cut in order to form an opening in the packaging enclosing the big bale; and at least one supporting means, the at least one supporting means and/or the gripper being arranged to effect relative movement between the big bale and the at least one gripper, whereby the packaging is separated from the contents of the big bale.

Preferably the at least one cutting means is arranged to be inserted into the big bale through a side portion of the big bale not covered by the binding material holding it together, and by rotary or linear motion or a combination thereof to cut through the binding material and the plastic foil that covers the adjacent face of the big bale.

Alternatively the at least one cutting means is arranged to be passed along the lateral faces of the big bale in order to be able, by means of at least a rotary, revolving or linear motion or a combination thereof, to make a cut through the packaging covering the adjacent face(s) of the big bale.

Preferably the motion of the at least one cutting means is controlled by at least one mechanically, hydraulically or electrically driven actuator.

Alternatively the motion of the at least one cutting means is manually controlled.

Preferably the at least one gripper is provided with one or more movable gripping means arranged to penetrate the plastic foil and grip a substantial part of the binding material covering the adjacent lateral face.

Preferably the at least one gripper is provided with one or more gripping devices arranged to grab hold of all the layers of packaging.

Advantageously the motion of the at least one gripper is controlled by at least one hydraulically or electrically driven actuator.

Preferably the supporting means is a bale fork provided with at least two spear-like parallel supporting arms arranged to penetrate the big bale.

Preferably the spacing of the supporting arms is adjustable.

Preferably the spacing of the supporting arms is regulated by at least one hydraulically or electrically driven actuator.

Alternatively the supporting means comprises a sectioned, substantially linear conveyor means.

Preferably the apparatus is mounted on a rolling tool.

Alternatively the apparatus is a fixed installation.

The following describes non-limiting examples of preferred embodiments illustrated in the accompanying drawings, in which.

Figure 1:
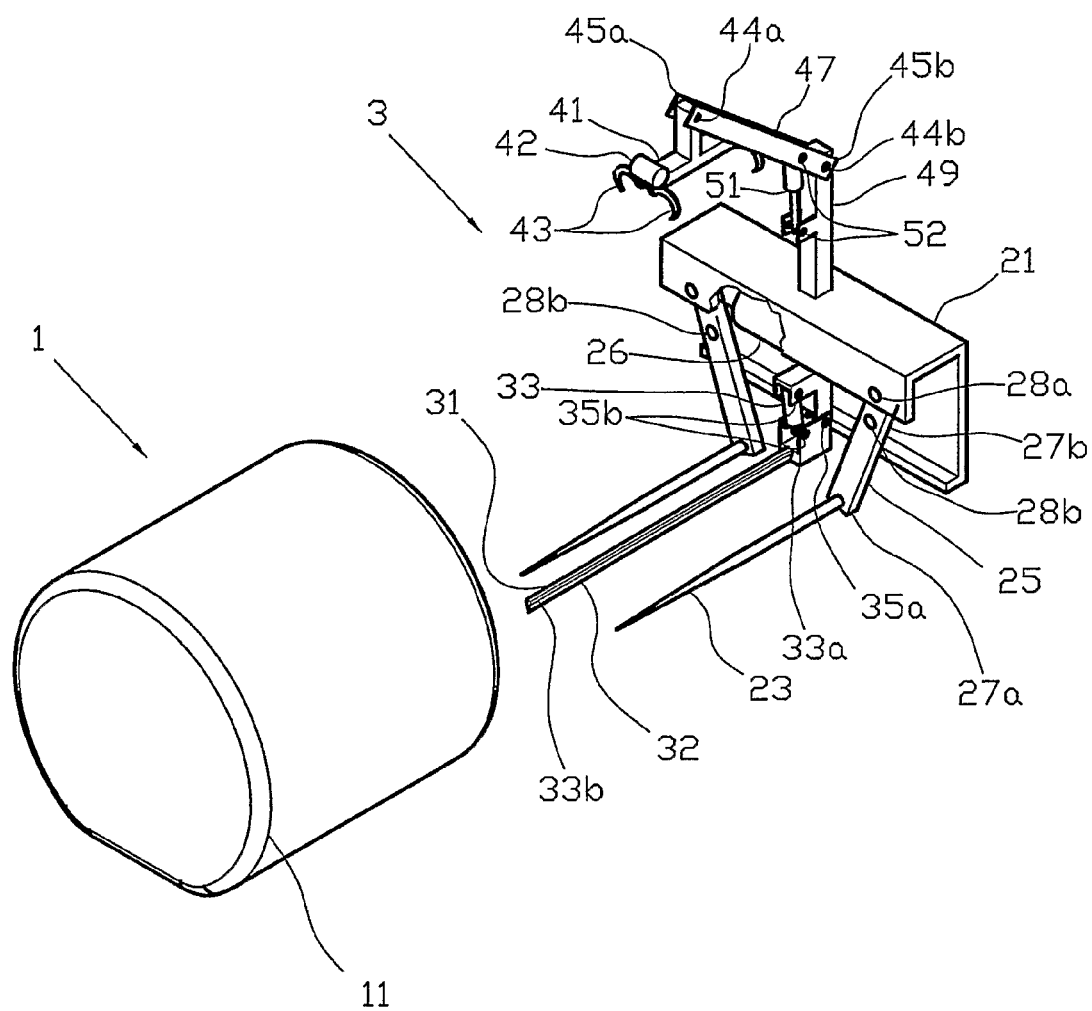
FIG. 1 shows a first example of embodiment where an apparatus of the invention, which is arranged for mounting on a rolling tool, is positioned by a round bale and ready to penetrate one end portion of the round bale.
Figure 2:
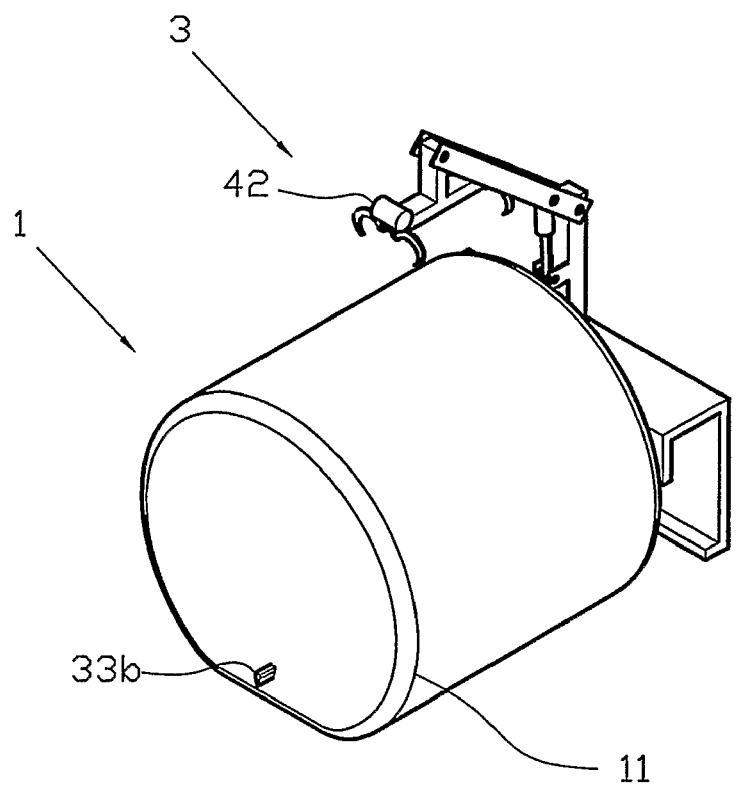
FIG. 2 shows the apparatus of the invention as its supporting means and cutting means have penetrated into and through the round bale, respectively.
Figure 3:
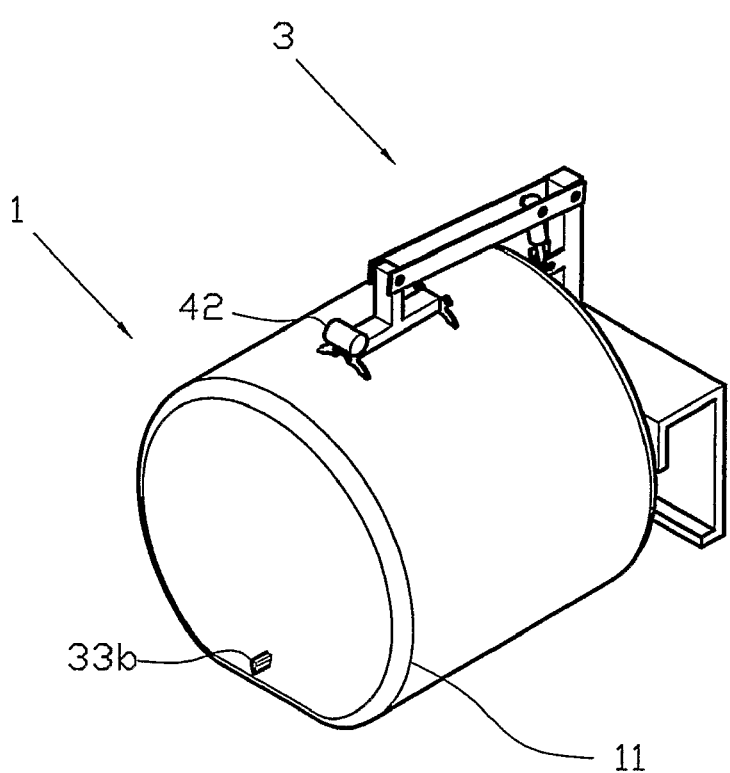
FIG. 3 shows the apparatus of the invention as its gripper has grabbed hold of the packaging at the top of the round bale.
Figure 4:
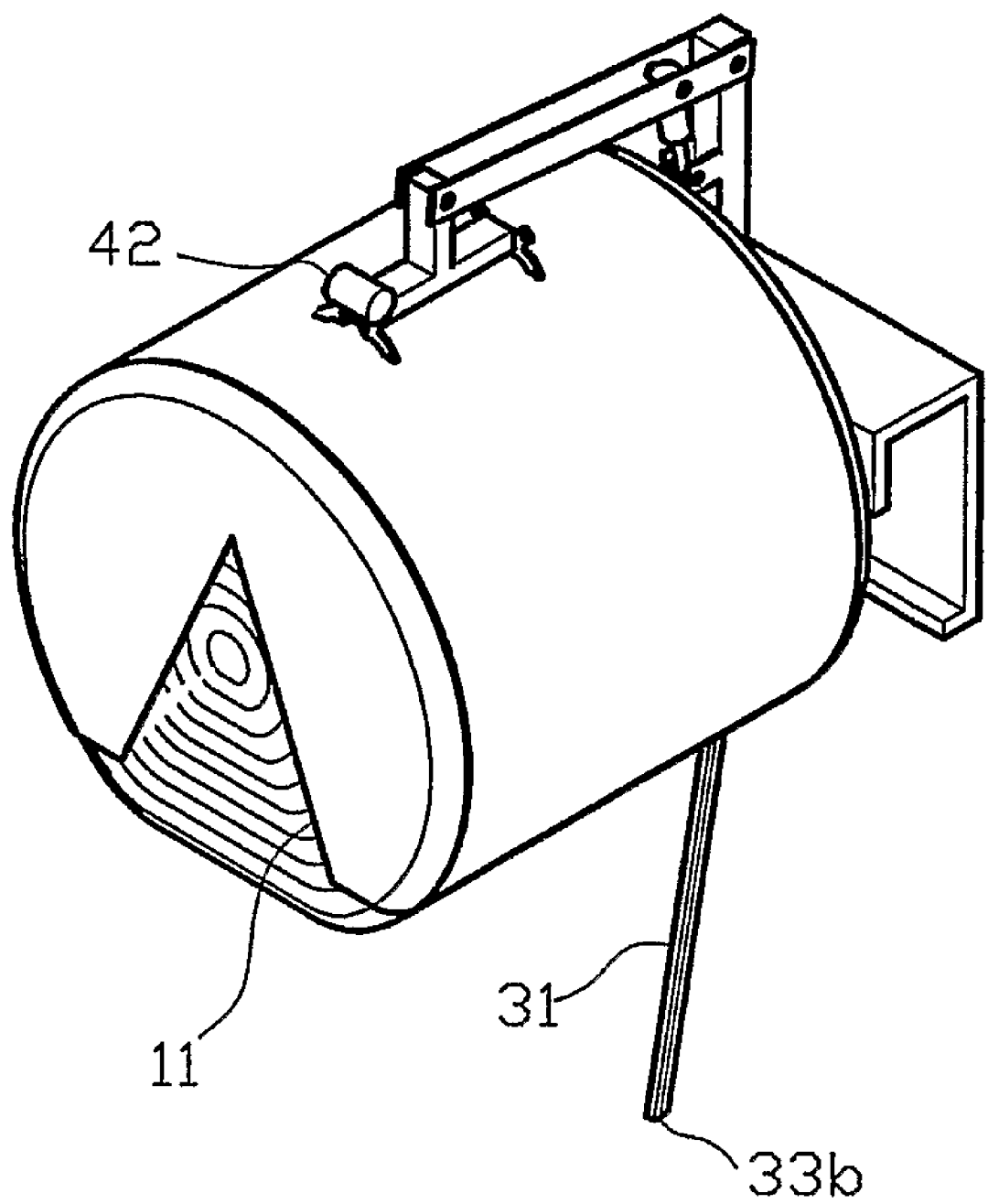
FIG. 4 shows the apparatus of the invention as the cutting means, using a revolving motion, has cut through the packaging at the bottom of the round bale.
Figure 5:
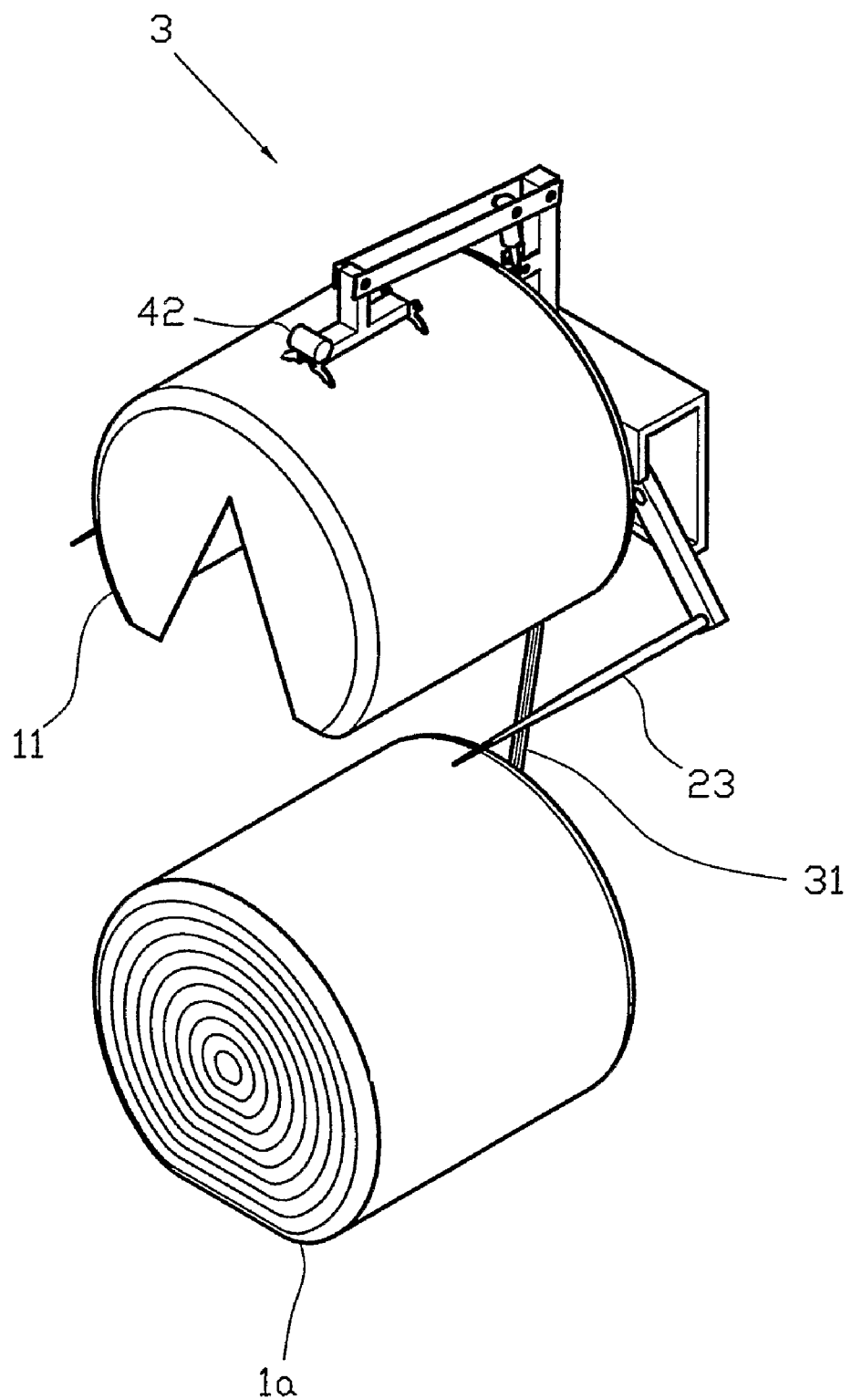
FIG. 5 shows the apparatus of the invention with the schematically illustrated packaging released from the gripper and the contents of the round bale free of the supporting means.

Reference is first made to FIG. 1 and FIGS. 2-5, where reference number 1 denotes a round bale completely enclosed by plastic foil and baler twine or baler net enclosing the shell of the round bale 1 inside the plastic foil, the plastic foil and baler twine/baler net being denoted packaging 11, for the sake of simplicity. A round bale without packaging 11 is indicated by reference number 1a.

A packaging remover 3 is provided with a frame 21, two supporting means in the form of spikes 23, each mounted at the first end portion 27 of a swivel arm 25. A second end portion 27b of the swivel arm 25 is pivotal connected to the frame 21 by a hinge pin 28a. The swivel arms 25 are interconnected and connected in a manner that is known per se to respective ends of an actuator 26, typically a double-acting hydraulic cylinder, by means of hinge pins 28b.

A cutting means in the form of a long straight knife 31 is pivotal connected to the frame 21 by a hinge pin 35a at the first end portion 33a of the knife. A second end portion 33b projects freely. The knife 31 and the frame 21 are also connected to separate ends of an actuator 33, typically a double-acting hydraulic cylinder, by means of hinge pins 35b. The knife 31 is equipped with a cutting edge 32 facing in the working direction of the knife 31, in this instance downwards. Preferably the length of the knife 31 exceeds the distance between two opposite sides of the bale, which the knife 31 is arranged to penetrate. In practice this means that the length of the knife may exceed the length of the spikes 23.

A gripper 41 comprises two pivotal interconnected jaw sections 43. The jaw sections 43 are arranged to penetrate the packaging and hold this in a firm grip. In addition the jaw sections 43 are connected to an actuator 44, typically a double-acting hydraulic cylinder. The gripper 41 is pivotal attached to a first end portion 45a of a cantilever arm 47 by means of a hinge pin 44a. A second end portion 45b of the cantilever arm 47 is pivotal attached, by means of a hinge pin 44b, to a tower 49 rising from the frame 21. The cantilever arm 47 and the tower 49 are also connected to separate ends of an actuator 51, typically a double-acting hydraulic cylinder, by means of hinge pins 52.

Figure 6:
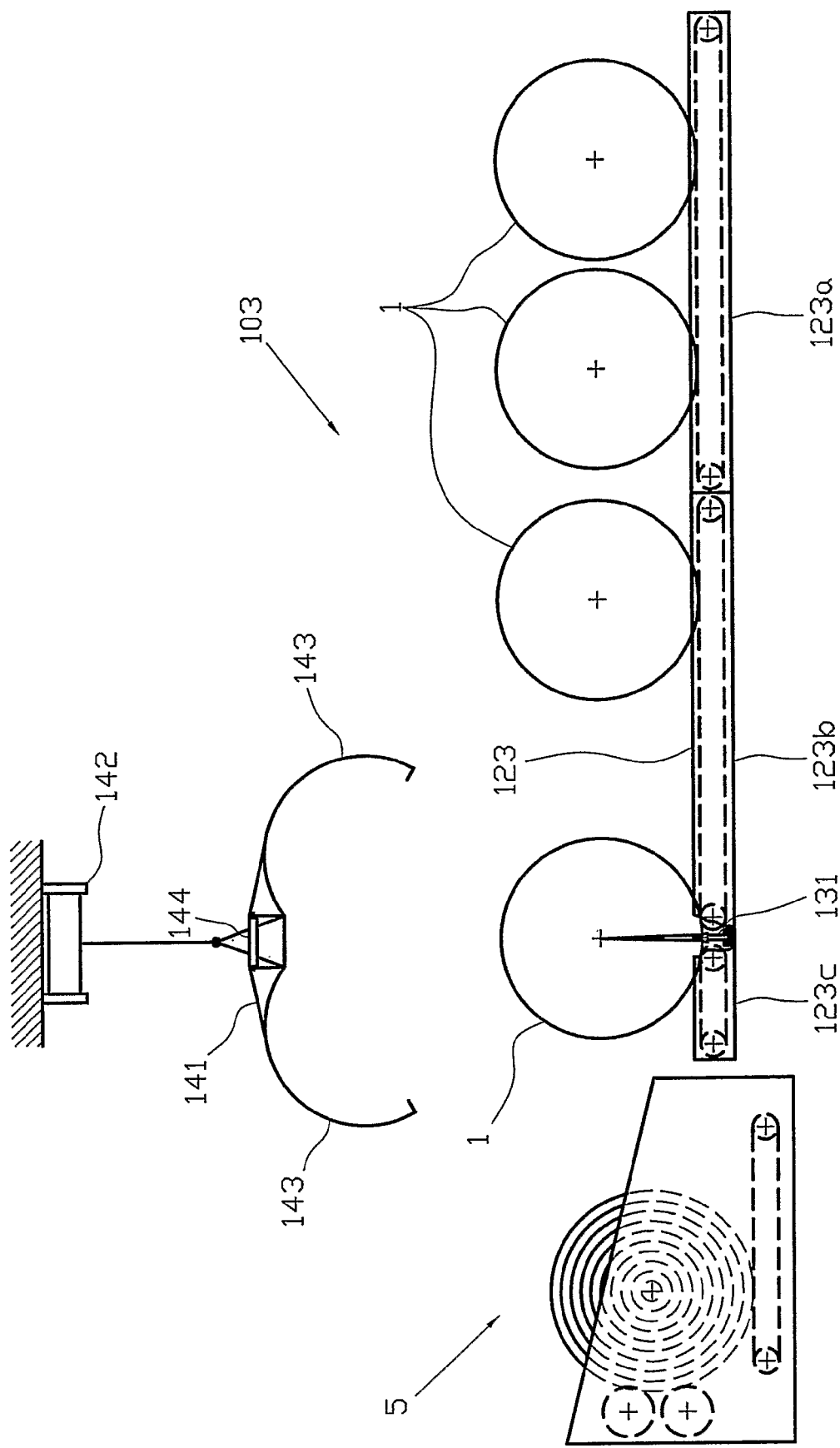
FIG. 6 shows, on a smaller scale, a second embodiment where an alternative apparatus of the invention, which is arranged for stationary mounting by a feeder, is provided with several round bales on a supporting means, and a cutting means has cut through the packaging at the bottom of one of the bales.
Figure 7:
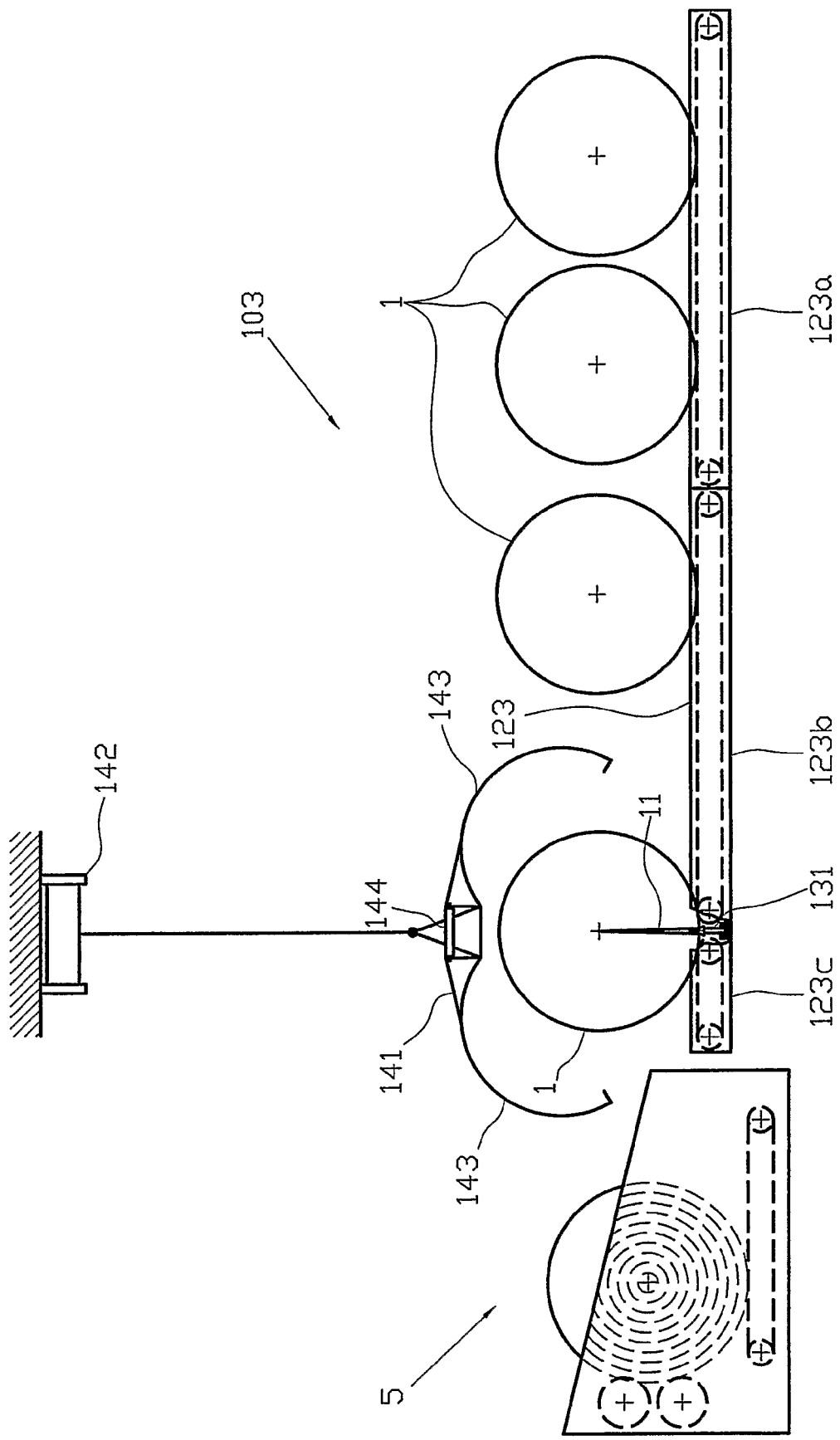
FIG. 7 shows the alternative example of embodiment of the apparatus of the invention with the gripper lowered around the round bale.
Figure 8:
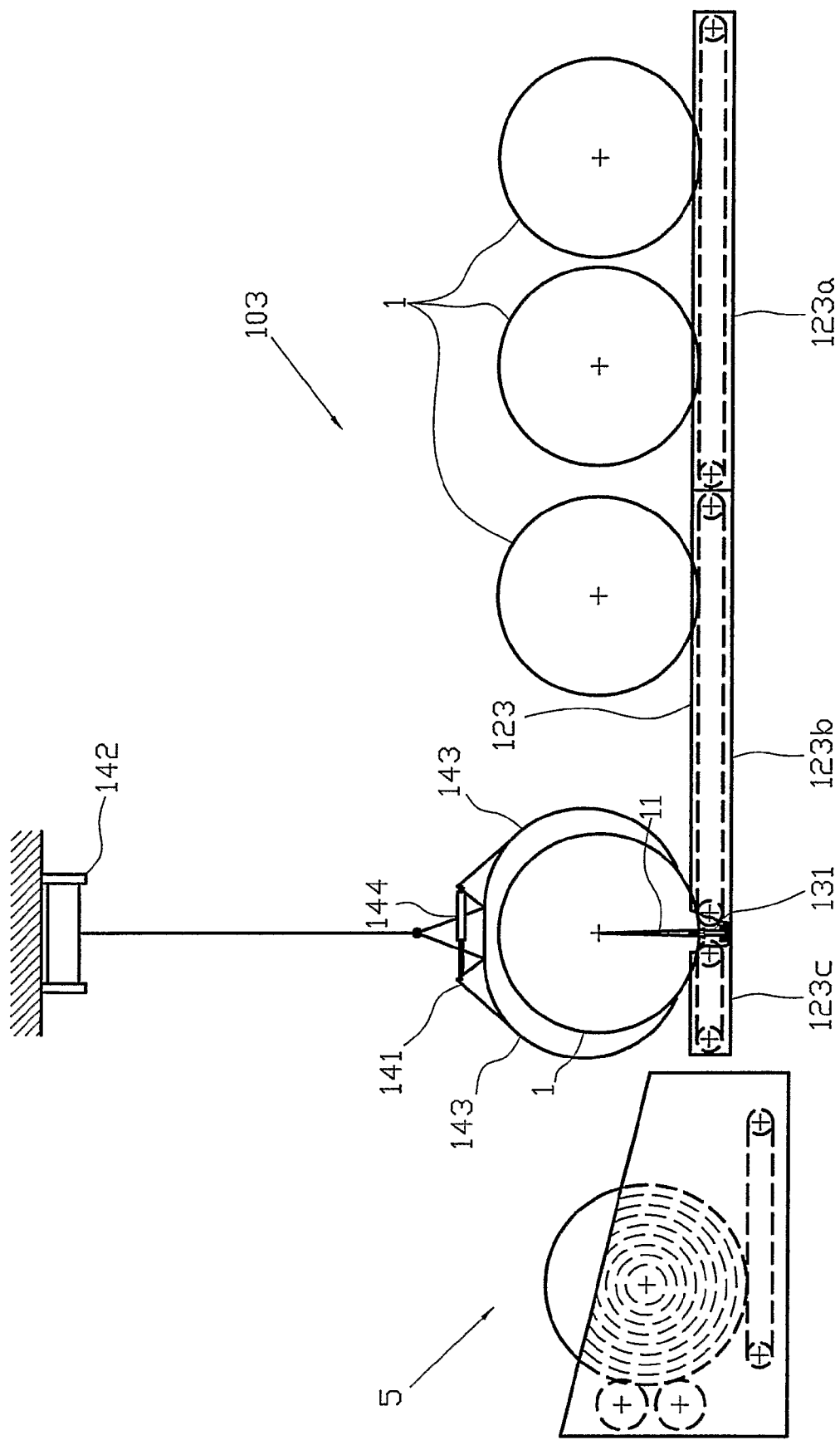
FIG. 8 shows the alternative example of embodiment of the apparatus of the invention as the gripper grips the packaging.
Figure 9:
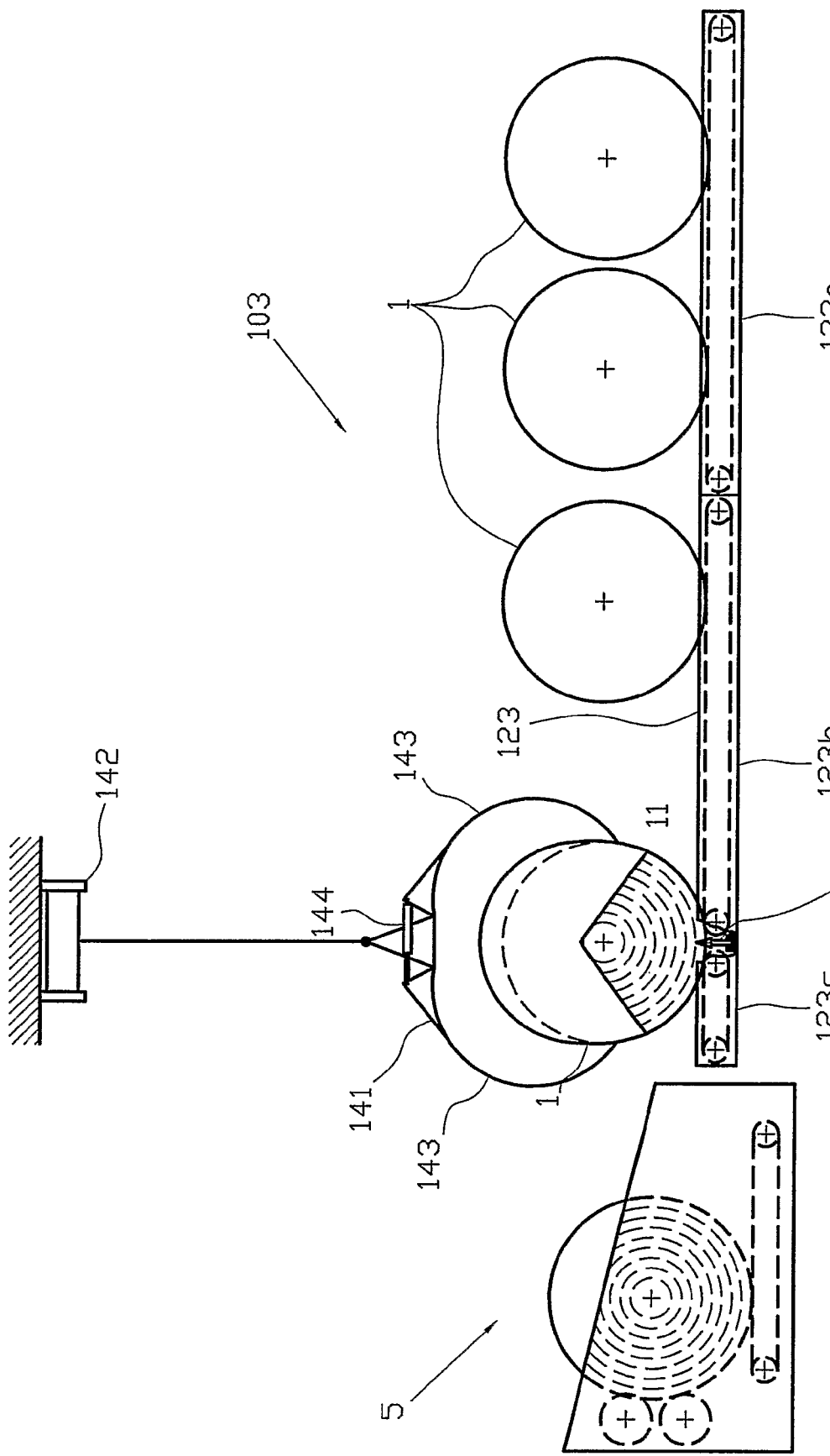
FIG. 9 shows the alternative example of embodiment of the apparatus of the invention when the gripper has removed the packaging from a lower part of the round bale.
Figure 10:
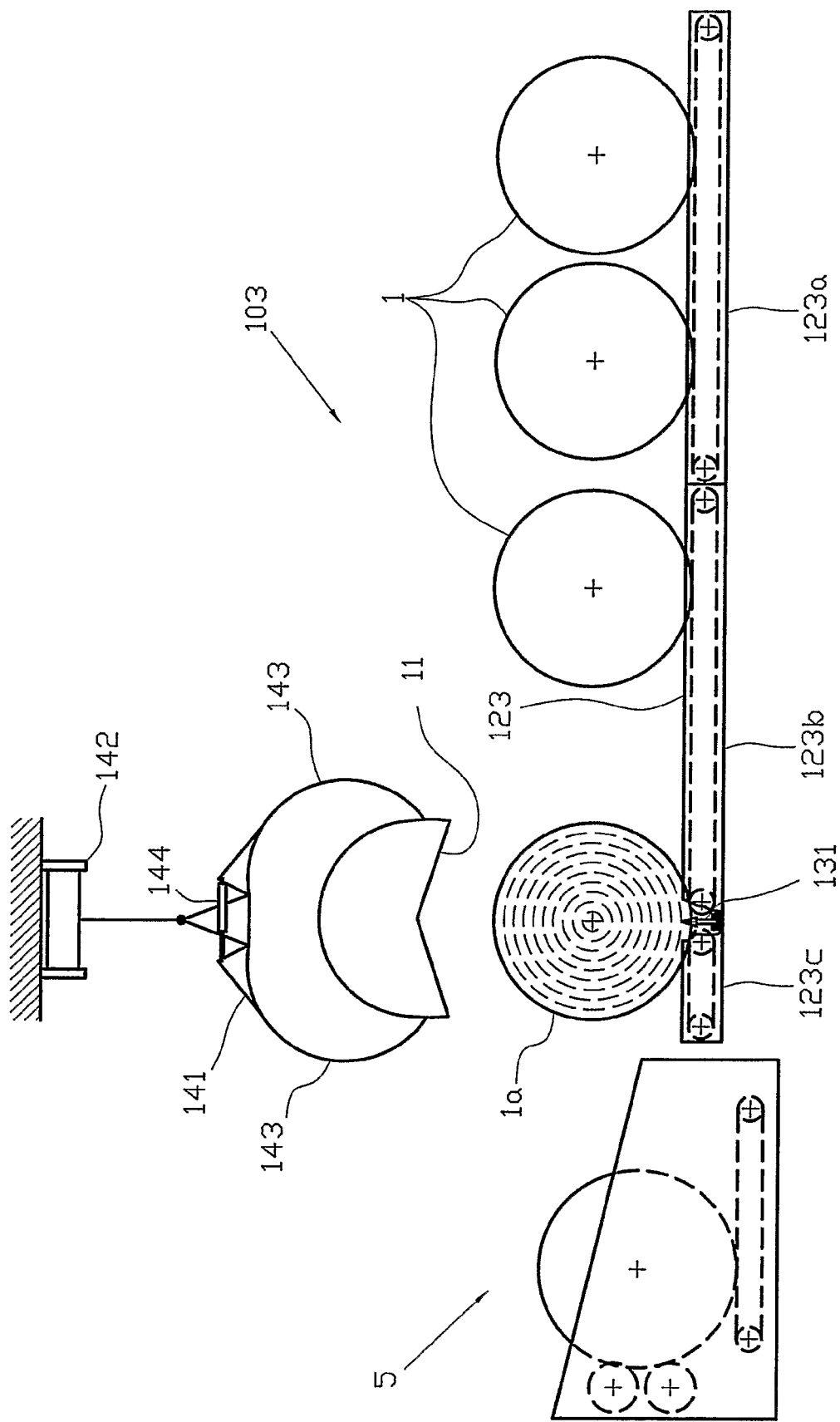
FIG. 10 shows the alternative example of embodiment of the apparatus of the invention when the gripper has completely removed the packaging from the round bale and the bale is ready to be transferred to the feeder.
Figure 11:
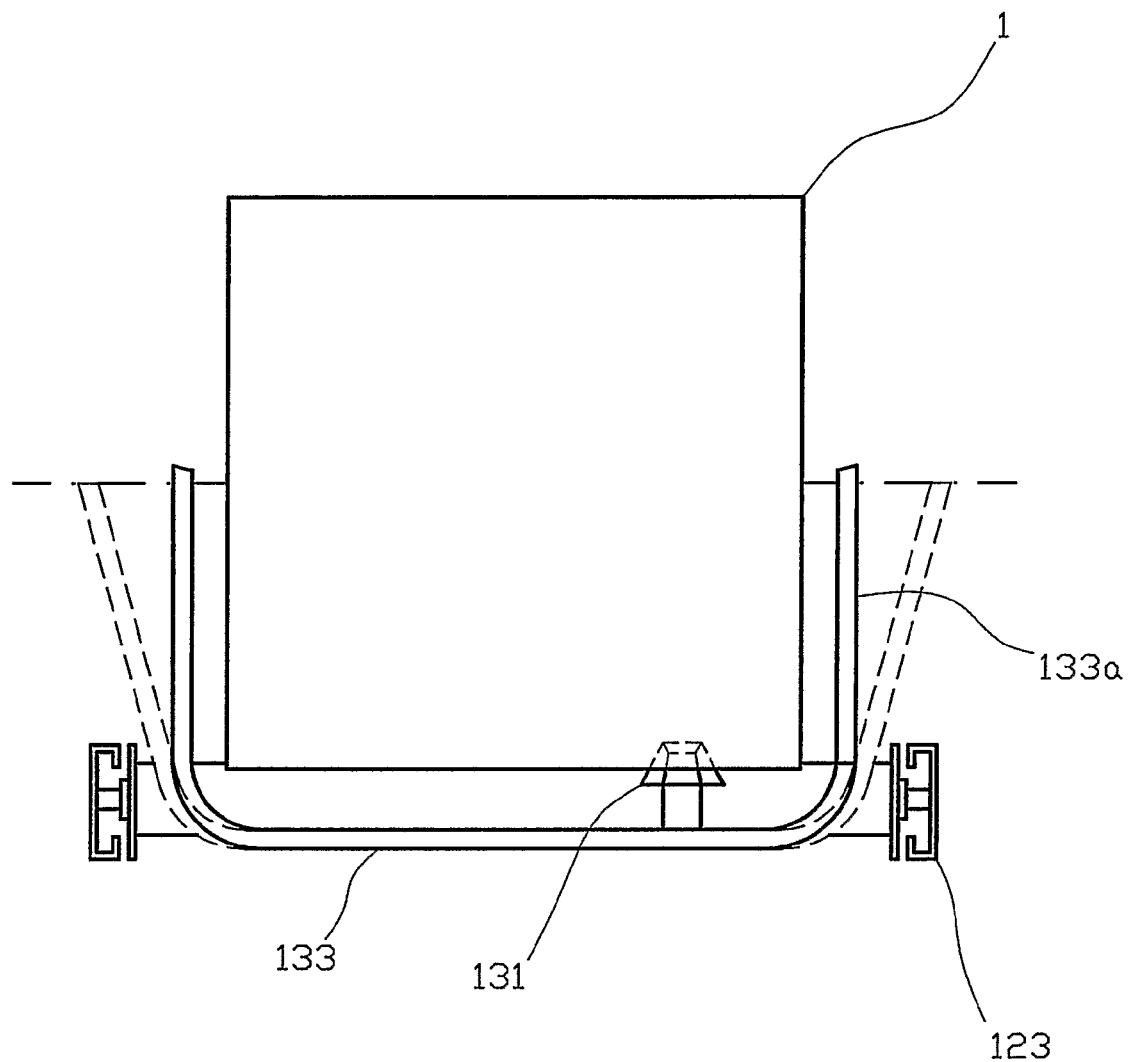
FIG. 11 is a larger scale schematic diagram of the supporting means as it is shown in FIGS. 6-10, seen transversely of the longitudinal direction of the supporting means.

Reference is now made to FIGS. 6-11, where a feeder 5 of a type that is known per se is placed, permanently or temporarily, at the end of a fixed packaging removal apparatus 103. To make the invention easier to understand the feeder 5 has been shown with an unpacked bale 1a, and the packaging removal apparatus 103 is shown as having two packaged round bales 1 queuing to be unpacked. The details of the feeder 5 are not discussed, as the feeder is not included in the invention.

The stationary package removal apparatus 103 is provided with supporting means in the form of a long, sectioned and substantially horizontal conveyor 123, here shown as having three sections 123a, 123b, 123c. The conveyor sections 123a, 123b, 123c are provided with actuators, typically electric motors (not shown) for manual or programmed motion control by a controlling device (not shown).

A cutting means in the form of a knife 131 is arranged for movement in a slot between two conveyor sections 123b, 123c and in a guideway 133 comprising two end portions 133a, the guideway extending along portions of the two end faces of the round bale 1 and across the entire surface shell of the bale, transversely of the longitudinal direction of the conveyor 123. The knife 131 is provided with one or more actuators (not shown) for manual or programmed motion control by a controlling device (not shown). Preferably the end portions 133a of the guideway 133 are pivotal fastened to allow them to be moved away from the end faces of the round bale 1 when this is being moved by the conveyor 123. Preferably the end portions 133a are provided with actuators, typically double-acting hydraulic cylinders (not shown) for manual or programmed positional control by a controlling device (not shown).

A gripper 141 is attached to a lifting device 142. The gripper 141 comprises two pivotal interconnected jaw sections 143. The jaw sections 143 are arranged to penetrate the packaging 11 and hold this in a firm grip. In addition the jaw section 143 is interconnected with an actuator 144, typically a double-acting hydraulic cylinder. The gripper 141 and the lifting device 142 are provided with a controlling device (not shown) for manual or programmed motion control.

The invention according to the first example of embodiment (see FIGS. 1-5) is typically connected to a tractor mounted front end loader having the appropriate mechanical and hydraulic, optionally electrical, connectors. The spikes 23 are positioned with spacing suitable for the size of the bale 1. The knife is positioned in parallel with the spikes 23. The movement of the tractor and the front loader carries the spikes 23 and the knife in through a lower portion of the end face of the bale 1, i.e. a face not covered by baler twine/baler net. For a round bale 1 this will be an end face. As a result of the movement of the package removal apparatus the second end portion 33b of the knife 31 will penetrate from the packaging 11 at the opposite end face, see FIG. 2.

The bale 1 is then lifted from the ground, the gripper 41 is lowered, gripping the packaging 11 by mutual movement of the jaw sections 43, as the jaw sections 43 penetrate the packaging 11. The knife 31 is moved, pivotal, out through the shell at the lower portion of the bale 1, forming an opening in the packaging 11. Through rotation of the swivel arms 25 the spikes 23 are moved apart, causing the spikes to break through the shell of the bale 1. This allows the contents 1a of the bale to fall down, the gripper 41 holding the packaging in a manner which allows it to be pulled away from the contents 1a of the bale. The packaging is placed in a suitable location and the unpacked bale 1a continues along the handling process of the contents 1a, e.g. to a feeding site for farm animals.

When handling a frozen bale 1, the option of moving the spikes 23 relative to each other by using the actuator 44 can also be utilized to free the packaging 11 from the surface of the bale contents 1a, the spikes 23 rapidly and briefly being moved apart before returning to the initial position. This movement can also be used to tear up the contents 1a of the bale in order to simplify the further separation. The degree of tearing is influenced by how far from the surface of the bale shell the spikes 23 are inserted.

The invention according to the second example of embodiment (see FIGS. 6-11) is mounted in a fixed manner, typically in a location suitable for the further handling of the fodder, e.g. by a feeding station for a feeder. Packaged bales 1 are placed on the conveyor 123 by means of a lifting device such as a tractor with a front end loader.

A bale 1 is placed in position at the cutting means 131. The cutting means 131 is activated by programmed or manual actuation, the cutting means 131 penetrating the surface of the bale 1 and making an essentially continuous cut in the packaging 11 in at least one of the lateral faces of the bale 1; for a round bale 1 typically in parts of the two end faces of the bale, and also across the intermediate shell.

The gripper 141 is lowered over the bale 1 in an open position, after which the jaw sections 143 are moved together, penetrating the packaging and gripping this. The middle gripping region of the gripper 141, which essentially coincides with the geometric centre of a projection of the gripper in plane that is perpendicular to the direction of motion of the gripper 141 relative to the bale 1 during removal of the packaging 11, is essentially opposite of the geometric common centre of the cuts made in the packaging 11. The packaging is lifted off the contents 1a of the bale by moving the gripper 141 up and away from the bale 1a.

The contents 1a of the bale are then moved away from the cutting means 131 by the conveyer section 123c, leaving it ready to receive the next bale 1. The bale is transferred to the feeder 5 or to intermediate storage (not shown) for unpacked bales 1a.

The invention claimed is:

1. An apparatus for removal of packaging from a bale, the apparatus comprising:
   a frame;
   a pair of swivel arms pivotally attached to the frame;
   a pair of spikes each mounted on one of the swivel arms;
   an actuator interconnected to the swivel arms;
   a knife having a cutting edge, the knife pivotally attached to the frame;
   an actuator interconnected between the knife and the frame; and
   a gripper having two pivotal jaw sections and an actuator interconnected with the jaw sections.

2. The apparatus of claim 1 further comprising:
   a tower located on the frame; and
   a cantilevered arm pivotally attached to the tower;
   wherein the gripper is pivotally attached to the cantilevered arm.

3. The apparatus of claim 1 further comprising the knife having a cutting edge and extending beyond the spikes.

4. The apparatus of claim 1, further comprising at least one of the actuators being hydraulically powered.

5. The apparatus of claim 1, further comprising at least one of the actuators being electrically powered.

6. The apparatus of claim 1, further comprising at least one of the actuators being manually powered.

7. The apparatus of claim 1, further comprising at least one of the actuators being mechanically powered.

8. The apparatus of claim 1, further comprising the spikes being moveable relative to each other.

* * * * *